United States Patent
Carson

(10) Patent No.: US 10,630,567 B1
(45) Date of Patent: Apr. 21, 2020

(54) METHODS, SYSTEMS AND COMPUTER READABLE MEDIA FOR MONITORING COMMUNICATIONS NETWORKS USING CROSS-CORRELATION OF PACKET FLOWS

(71) Applicant: Illuminate Technologies, LLC, Columbia, MD (US)

(72) Inventor: Douglas John Carson, Stirling (GB)

(73) Assignee: ILLUMINATE TECHNOLOGIES, LLC, Columbia, MD (US)

( * ) Notice: Subject to any disclaimer, the term of this patent is extended or adjusted under 35 U.S.C. 154(b) by 0 days.

(21) Appl. No.: 15/889,157

(22) Filed: Feb. 5, 2018

(51) Int. Cl.
*H04L 12/26* (2006.01)
*H04L 12/851* (2013.01)
*H04L 12/24* (2006.01)

(52) U.S. Cl.
CPC .......... *H04L 43/10* (2013.01); *H04L 41/142* (2013.01); *H04L 47/2441* (2013.01); *H04L 43/087* (2013.01); *H04L 43/0841* (2013.01); *H04L 43/0864* (2013.01)

(58) Field of Classification Search
CPC ... H04L 43/10; H04L 41/142; H04L 47/2441; H04L 43/0841; H04L 43/0864; H04L 43/087
See application file for complete search history.

(56) References Cited

U.S. PATENT DOCUMENTS

| | | | |
|---|---|---|---|
| 5,315,580 A | 5/1994 | Phaal | |
| 6,160,758 A | 12/2000 | Spiesberger | |
| 6,922,417 B2 * | 7/2005 | Vanlint | H04L 1/24 370/411 |
| 10,230,824 B2 * | 3/2019 | Bergeron | H04L 69/22 |
| 2001/0050903 A1 * | 12/2001 | Vanlint | H04L 1/24 370/252 |
| 2008/0077688 A1 * | 3/2008 | Ahrndt | H04L 65/605 709/224 |

(Continued)

OTHER PUBLICATIONS

Weisstein, "Cross-Correlation Theorem," MathWorld—A Wolfram Web Resource, http://mathworld.wolfram.com/Cross-CorrelationTheorem.html, pp. 1 (Copyright 1999-2018, downloaded from the Internet Feb. 5, 2018).

(Continued)

*Primary Examiner* — Kashif Siddiqui
(74) *Attorney, Agent, or Firm* — Miles & Stockbridge P.C.

(57) ABSTRACT

The subject matter described herein includes methods, systems and computer media for monitoring communications networks using cross-correlation of packet flows. One method for monitoring a communications network using cross-correlation of packet flows includes receiving a plurality of packets copied from a communications network. The method further includes classifying the packets into flows. The method further includes, for at least one of the flows, generating a trace value sequence, where the trace value sequence is sequence of values that characterizes the flow according to a cross-correlation metric. The method further includes performing a frequency domain cross-correlation for the at least one flow using the trace value sequence. The method further includes outputting an indication of a network or flow characteristic based on results of the cross-correlation.

21 Claims, 6 Drawing Sheets

(56) References Cited

U.S. PATENT DOCUMENTS

| | | | |
|---|---|---|---|
| 2008/0165874 A1 | 7/2008 | Steele et al. | |
| 2010/0091676 A1* | 4/2010 | Moran | H04L 47/10 |
| | | | 370/252 |
| 2011/0103238 A1* | 5/2011 | Monk | H04L 43/026 |
| | | | 370/252 |

OTHER PUBLICATIONS

Hofstede et al., "Flow Monitoring Explained: From Packet Capture to Data Analysis with NetFlow and IPFIX," pp. 1-29 (2014).

Zhang et al., "Adaptive correlation analysis in stream time series with sliding windows," Computers and Mathematics with Applications, vol. 57, pp. 937-948 (2009).

AsSadhan et al, "Network Traffic Behavior Analysis by Decomposition into Control and Data Planes," pp. 1-8 (2008).

Sakurai et al, "BRAID: Stream Mining through Group Lag Correlations," pp. 1-12 (2005).

Zhu et al, "StatStream: Statistical Monitoring of Thousands of Data Streams in Real Time," Proceedings of the 28th VLDB Conference, pp. 1-12 (2002).

Brownlee et al, "Traffic Flow Measurement: Architecture," RFC 2063, pp. 1-37 (Jan. 1997).

Schulzrinne et al, "RTP: A Transport Protocol for Real-Time Applications," RFC 1889, pp. 1-75 (Jan. 1996).

\* cited by examiner

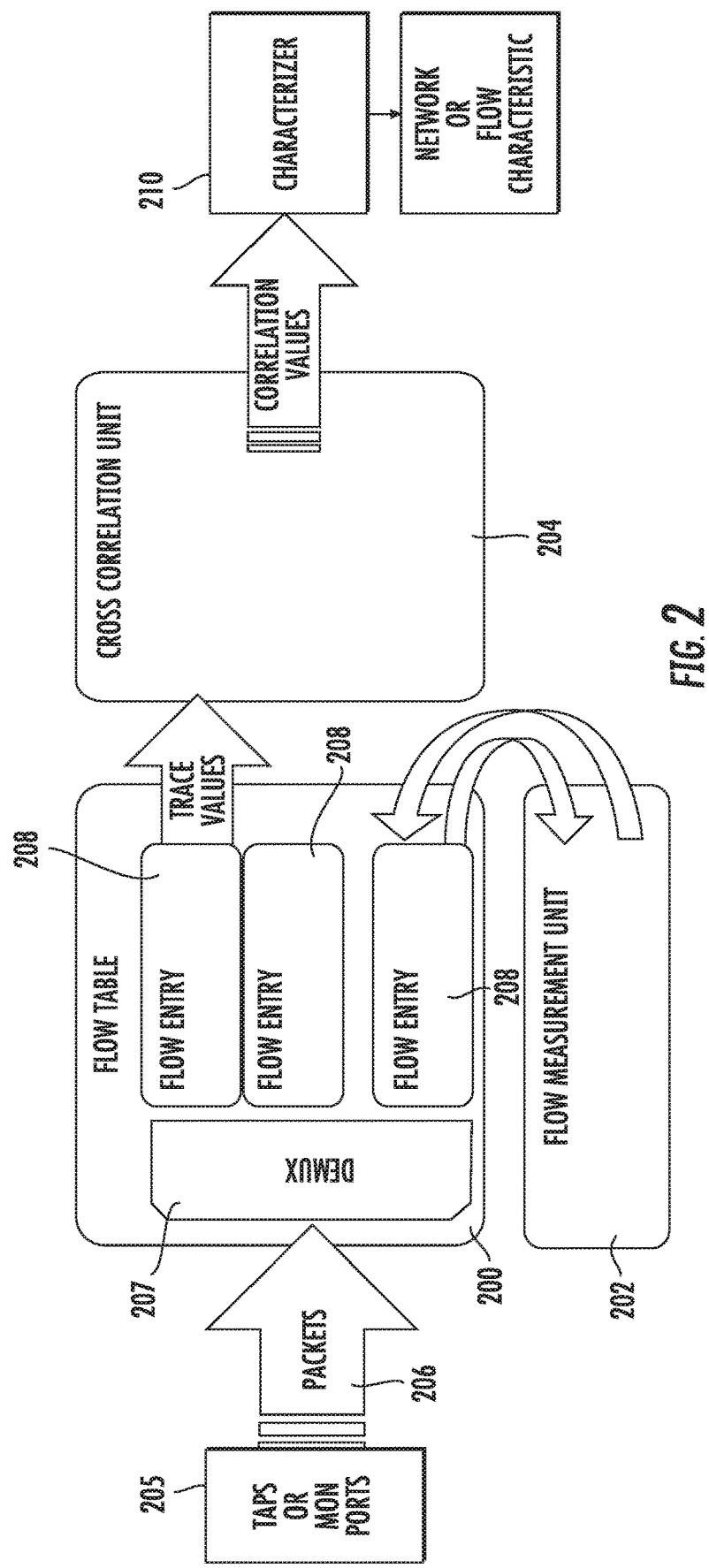

METHODS, SYSTEMS AND COMPUTER READABLE MEDIA FOR MONITORING COMMUNICATIONS NETWORKS USING CROSS-CORRELATION OF PACKET FLOWS

TECHNICAL FIELD

The subject matter described herein relates to monitoring computer networks. More particularly, the subject matter described herein relates to methods, systems, and computer readable media for monitoring computer networks using cross-correlation of packet flows.

BACKGROUND

A common problem in communications networks is the cross-correlation of network flows to identify:
traffic routing issues,
jitter and latency in media,
packet loss and packet re-ordering,
address translation mappings,
correct operation of load balancers, and
loss of privacy in traffic anonymizing mixers.

A simple environment is shown in FIG. 1 where the two ingress packet flows 100 and 102 are partially mixed on the egress flows 104 and 106 and experience jitter. The term "packet flow" as used herein, refers to a group of related packets, typically having one or more common packet header parameters. In FIG. 1, packet number 2 from ingress flow 102 appears in egress flow 104. Similarly, packet number 2 in ingress flow 100 appears in egress flow 106. Because of different delays experienced by packets as the packets travel through different paths across a network, jitter may result. In FIG. 1, the jitter is illustrated by the difference in inter-arrival times of packets 1 and 3 in egress flow 104 versus packets 1 and 2 in egress flow 106. It is desirable to use methods, such as correlation between network flows, to measure such jitter.

One approach to performing correlation between packet flows is to track a unique identifier included in a packet occurring a known location in a packet flow and timestamp the packet at the ingress and egress points in the network to determine the latency. Such an approach is described in U.S. Pat. No. 6,922,417. The disadvantages of this method are that it only provides a single latency measurement and cannot be practically used for jitter occurring within the flow. To measure jitter using such a method, each packet would have to be timestamped at ingress and egress points, latency would then be calculated for each packet, and then the different latencies could be compared to measure jitter. Time stamping each packet at the ingress and egress points in calculating latency for each packet may be computationally impractical, especially in high speed networks.

Jitter can be accurately measured if timing and sequencing information is included in every packet. One protocol where timing and sequencing information is included in every packet is the real time protocol (RTP), as described in Internet Engineering Task Force (IETF) Request for Comments (RFC) 1889, and used for media streams. According to RFC 1889, synchronized clocks can be used to timestamp monitored packets at the ingress and egress, and latency and jitter can be calculated throughout the stream. Packet drops and retransmissions can also be detected using the sequencing information in the packets. The disadvantages of this method are that large amounts of data must be collected from the network, synchronized clocks must be implemented in the network, and the protocol being measured must explicitly support timestamps and sequence numbers. A variation on this technique is to inject timing packets in-band with the media streams, an example being the precision time protocol (PTP) described in the IEEE 1588 standards. This method eliminates the need to have timestamps in the packets, but is less accurate because timing packets may be treated differently by the network than media packets.

Another approach to measuring packet timings in a packet flow is packet sampling, as described in U.S. Pat. No. 5,315,580. This method greatly reduces data traffic and can identify large scale traffic trends but cannot perform precision measurements, such as jitter, within a flow.

A more brute force approach to measuring differences in packet timings is to perform cross-correlation on traffic flows. An example of such cross-correlation is described in "Network Traffic Behavior Analysis by Decomposition into Control and Data Planes," IEEE International Symposium on Parallel and Distributed Processing (IPDPS) (2008). This method selects features from packets and then performs a Pearson cross-correlation. This method allows a variety of analysis to be performed but the computational complexity is $O(N^2)$, which makes the method difficult to scale. The method also requires mass data collection which may have privacy concerns.

In light of the disadvantages associated with conventional methods for monitoring networks and measuring packet timings, there exists a need for improved methods, systems, and computer readable media for monitoring communications networks. Such methods, systems, and computer readable media preferably provide reduced computational complexity over conventional methods and are suitable for analyzing load volumes of packets.

SUMMARY

The subject matter described herein includes methods, systems and computer media for monitoring communications networks using cross-correlation of packet flows. One method for monitoring a communications network using cross-correlation of packet flows includes receiving a plurality of packets copied from a communications network. The method further includes classifying the packets into flows. The method further includes, for at least one of the flows, generating a trace value sequence, where the trace value sequence is sequence of values that characterizes the flow according to a cross-correlation metric. The method further includes performing a frequency domain cross-correlation for the at least one flow using the trace value sequence. The method further includes outputting an indication of a network or flow characteristic based on results of the cross-correlation.

A system for monitoring a communications network using cross-correlation of packet flows includes a demultiplexer for receiving packets traversing a communications network and for classifying the packets into flows. The system further includes a flow measurement unit for generating a trace value sequence for at least one of the flows, where the trace value sequence is a sequence of values that characterizes a flow according to a cross-correlation metric. The system further includes a cross-correlation unit for performing frequency domain cross-correlation of the at least one flow using the cross-correlation metric and the trace value sequence. The system further includes a characterizer for outputting an indication of a network or flow characteristic based on results of the cross-correlation.

The subject matter described herein for monitoring communications networks using cross-correlation of packet flows may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, wherein like reference numerals represent like parts, of which:

FIG. 2 is a block diagram of a system for monitoring communications networks using cross-correlation of packet flows;

DETAILED DESCRIPTION

Figure 1:
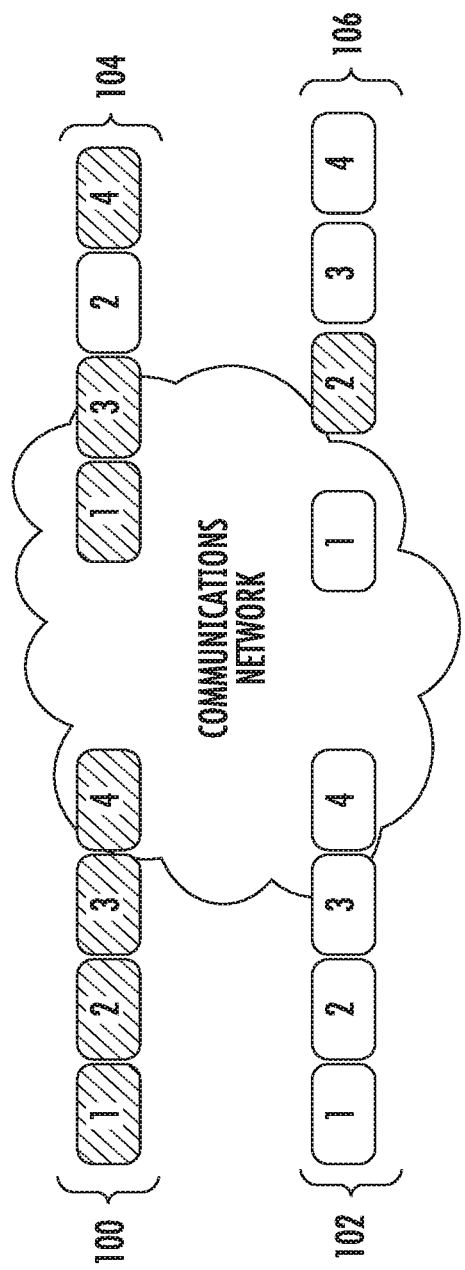
FIG. 1 is a block diagram illustrating mixing and jitter between packet flows.

The subject matter described herein includes methods, systems, and computer readable media for monitoring communications networks using cross-correlation of packet flows. Rather than performing cross-correlation using the above-referenced Pearson cross-correlation, the subject matter described herein performs cross-correlation of packet flows in the frequency domain, which reduces computational complexity. The cross-correlation can be performed on any suitable cross-correlation metric, examples of which are described below. An indication of a network or flow characteristic may be output based on the results of the cross-correlation.

One aspect of the subject matter described herein includes a demultiplexer that uses a network flow table to demultiplex network traffic by a 5-tuple (source Internet protocol (IP) address, destination IP address, source user datagram protocol (UDP) port, destination UDP port and protocol). The flow table includes a flow table entry for each newly identified packet flow. A flow measurement unit generates trace value sequences for each identified packet flow. The trace value sequence for each flow may be a sequence of measurements at the agreed upon points in the flow. For example, the trace value sequence can be a sequence of maximum value seen in packet payload octets over an interval of P packets in a flow, where P is a configurable constant, a mean value of packet payload octets, etc. Additional examples of measurements for a flow will be described below. To reduce the amount of data collected for each flow, a filter may be used to mask the 5-tuple or other flow identifier for each flow. It is not necessary to store the 5-tuple for each packet in the flow because the 5-tuple will be the same for packets in the flow. The measurement points in the flow can be adjusted to further reduce the amount of data collected.

According to another aspect of the subject matter described herein, the computational complexity is reduced by use of the cross-correlation theorem (Weisstein, Eric W., "Cross-Correlation Theorem." From MathWorld—A Wolfram Web Resource, http://mathworld.wolfram.com/Cross-CorrelationTheorem.html), which performs correlation in the frequency domain with linear complexity. The transformation to the frequency domain can be accomplished with a fast Fourier transform (FFT) with O(N log N) complexity. This is a massive reduction for large traces.

Initially the traces being fed to the FFT were padded with zeros, but it was found that this gave incorrect answers. This was because the traces are not symmetric as is normally the case with time domain measurements. Padding with the mean of the trace solved the problem. Details of the frequency domain cross-correlation with mean value padding are provided below.

Exemplary advantages of the subject matter described herein are reductions in trade-offs between measurement accuracy, data collection volume and computational complexity over previous approaches.

The flow table provides well-defined synchronized measurement points and allows different measurement features to be extracted depending on the protocol. As will be described in detail below, in one implementation, each flow table entry includes a state variable which is set to either "measure" or drop". The stateful approach of the flow table allows additional measurements on connections to be generated, such as the extraction of packet metadata and connection summary information that can be used for purposes, such as billing.

Operating in the frequency domain provides a theoretical N/log N speedup using the cross-correlation theorem. Libraries and/or application specific integrated circuits (ASICs) may be used to perform FFTs efficiently because FFTs are such a common operation for signal processing. Using these optimized libraries or devices will give significantly reduced size and power requirements compared to an implementation on a general-purpose processor.

FIG. 2 is a block diagram illustrating exemplary components of a system for monitoring communication networks using cross-correlation of packet flows. In FIG. 2, the components include a flow table 200, a flow measurement unit 202 and the cross-correlation unit 204. The input to the system is one or more network monitoring ports or network taps 205 delivering a stream of packets 206. The outputs of the system are cross-correlation function values for pairs of flows which are stored in computer memory. Each of the components illustrated in FIG. 2 may be implemented by at least one processor.

Outputs of the system may also include network load characteristic, which are determined based on results of the cross-correlations. Examples of network characteristics that may be output include measurements of packet latency or jitter between flows. Examples of flow characteristics that may be output include indications of encryption quality, loss of privacy, misrouted packets, or other characteristic of a flow.

A demultiplexer 207 receives a stream of packets and decodes each packet to extract the 5-tuple (IP source, IP destination, protocol, source port, destination port). Packets are routed to the flow table entry 208 that corresponds to 5-tuple values. If the corresponding flow table entry does not exist, a new flow table entry is created, and flow table entries that have no activity over a pre-determined time are aged out to save memory. As stated above, each flow table entry 208 has measurements specific to the flow and a state variable that has a value of either "measure" or "drop". The state variable is initialized to "measure" when a flow is created and set to "drop" when the flow ages out. For each packet arriving on a flow, demultiplexer 207 tests the value of the state variable. If the state variable is set to "measure" the packet is passed to flow measurement unit 202 together with a reference to the flow entry. If the value of the state variable is set to "drop" then the packet is ignored and no further processing occurs. Flow table 200 can be implemented as a field programmable gate array (FPGA) line card or as a combination of a network interface card (NIC) and software receiving frames via direct memory access (DMA).

Flow measurement unit 202 receives a copy of each packet to be processed and a reference to the flow entry with which the packet is associated. Flow measurement unit 202 can be implemented in software or as programmable logic on an FPGA line card. The processing of the packet by flow measurement unit 202 may result in additional measurements being appended to the flow table entry or the update of temporary measurements in the flow table entry. The amount of measurements generated may be significantly less (at least three orders of magnitude) than the packet data rate. The measurements are conducted across programmable intervals in the flow calculated by counting packets to achieve correlation. Measurements performed by measurement unit 202 may include:

- Maximum value in the packet payload octets over an interval of P packets, where P is a programmable constant,
- Mean value of packet payload octets over an interval of P packets,
- Checksum of the packet payload octets over an interval of P packets,
- Entropy of the packet payload octets over an interval of P packets, and
- The octet values between offset O1 and O2 for the first packet over an interval of P packets.

Any of the above listed measurements can be used as a cross-correlation metric by cross-correlation unit 204. For example, if the maximum values in packet payload octets over an interval of P packets are used, a given flow can be characterized by a sequence of such values. Since each octet can have a value between 0 and 255, a sequence of maximum values for packet payload octets used to characterize one flow may be (128, 200, 253, 196, 204). Such a sequence of values used to characterize a flow is referred to herein as a trace value sequence for the flow. Similar trace value sequences may be generated for other flows. The trace value sequences, when correlated between flows can be used to detect timing offsets, jitter, latency, or other timing related measurements between flows. Continuing with the example, trace value sequences of maximum payload octet values can be cross-correlated between or among flows. The cross-correlation values will be high at locations in the flows where the payload octet maximum values correspond across flows and low where the maximum values do not correspond. If the maximum payload values are supposed to occur at the same locations in the flows, the cross-correlation can be used to detect offsets between the maximum octet values, which provide an indication of timing offsets between the flows. The timing offsets can be used to calculate latency and jitter.

Similarly, if the trace value sequence is a sequence of checksum values, the checksum values may likewise be used to correlate timing related offsets between flows. If the trace value sequence is a sequence of packet payload octet entropy values, the entropy values can be used to characteristics of a flow itself, such as quality of encryption in a flow. For example, a trace value sequence of a first set of payload entropy values for a flow can be cross-correlated with a trace value sequence of a second set of entropy values for the flow, where the trace value sequences are offset in time from each other. If there is a high correlation between the entropy values, then the quality of encryption may be determined to be poor, because encryption should produce packet payload entropy values that do not correlate with each other or repeat over time. If there is a low correlation between entropy values for the flow, then the quality of the encryption may be determined to be high.

In another example, a trace value sequence for a flow may include a packet octet value for each packet between offsets O1 and O2 in each packet. The offsets O1 and O2 may be integers defined to exclude packet headers and trailers. Such trace value sequences can be used to compute timing related metrics. For example, trace value sequences of packet payloads octet values can be cross-correlated with each other and used to detect corresponding packets across flows and compute timing related offsets, latency, and jitter across the flows.

The measurements in a table flow entry are flushed when a flow is aged out to form the trace value sequence associated with the flow. The trace values are sent to cross-correlation unit 204 which stores and indexes the traces by a unique identifier for each flow. Cross-correlation unit 204 is instructed to calculate the cross-correlation for flows identified by their respective unique identifiers.

Cross-correlation unit 204 calculates the values of the cross-correlation function as a function of the lag value (Cn) using the above-referenced Cross-correlation theorem. The cross-correlation is calculated between a trace value sequence s(n) of N values and a trace value sequence t(m) of M values where N and M are integers and N>M. These trace value sequences are padded to length 2N with the mean of the trace value sequences to form functions x(n) and y(n) as follows:

$$x(n) = \begin{cases} s(n), & 0 \leq n < N \\ \frac{1}{N}\sum_{m=0}^{N-1} s(m), & N \leq n < 2N \end{cases}$$

$$y(n) = \begin{cases} t(n), & 0 \leq n < M \\ \frac{1}{M}\sum_{m=0}^{M-1} t(m), & M \leq n < 2N \end{cases}$$

A twiddle factor constant W is defined and can be used to express the Kronecker Delta function.

$$W = e^{j2\pi/N} \quad \delta(k) = \frac{1}{N}\sum_{n=0}^{N-1} W^{kn} = \begin{cases} 1, k = 0 \\ 0, k \neq 0 \end{cases}$$

The discrete Fourier transform (DFT) and inverse discrete Fourier transform (IDFT) are defined as follows:

$$X(k) = \mathcal{F}[x](k) = \sum_{n=0}^{N-1} x(n)W^{-kn}$$

$$x(n) = \mathcal{F}^{-1}[X](n) = \frac{1}{N}\sum_{n=0}^{N-1} X(n)W^{kn}$$

The definitions above can be substituted into the definition of the cross-correlation function to give a frequency domain based calculation.

$$C(n) = \sum_{m=0}^{N-1} x^*(m) y(n+m)$$

$$= \sum_{m=0}^{N-1} \frac{1}{N} \sum_{k=0}^{N-1} X^*(k) W^{-km} \frac{1}{N} \sum_{k'=0}^{N-1} Y(k') W^{k'(n+m)}$$

$$= \left[ \frac{1}{N} \sum_{k=0}^{N-1} X^*(k) \sum_{k'=0}^{N-1} Y(k') W^{nk'} \right] \frac{1}{N} \sum_{m=0}^{N-1} W^{m(k'-k)}$$

$$= \frac{1}{N} \sum_{k=0}^{N-1} X^*(k) \sum_{k'=0}^{N-1} Y(k') W^{nk'} \delta(k'-k)$$

$$= \sum_{k=0}^{N-1} X^*(k) Y(k) W^{kn}$$

$$= \mathcal{F}[X^*(k) Y(k)](n)$$

The cross-correlation of the two trace value sequences can therefore be calculated by a DFT of the elementwise multiplication of the complex conjugate of the DFT of a mean padded trace value sequence with the DFT of another mean padded trace value sequence. Cross-correlation unit 204 can be implemented using a signal processing library or as an ASIC optimized for signal analysis.

In one example, the cross-correlation may be the cross-correlation between two or more flows by cross correlating their respective trace value sequences. In another example, the cross-correlations may be a cross-correlation of a flow with itself, referred to as an auto-correlation. The cross-correlation output by cross-correlation unit 204 is input to a characterizer 210. Characterizer 210 outputs an indication of a network or flow characteristic based on results of the cross-correlation. For example, if the cross-correlation is between octet values or other correlation metric between two flows, characterizer 210 may output an indication of a timing-related characteristic latency or jitter between the two flows. If a packet flow is cross-correlated with itself or auto-correlated, the auto-correlation may be used to detect echoing or repeated traffic in a sequence.

Figure 3A:
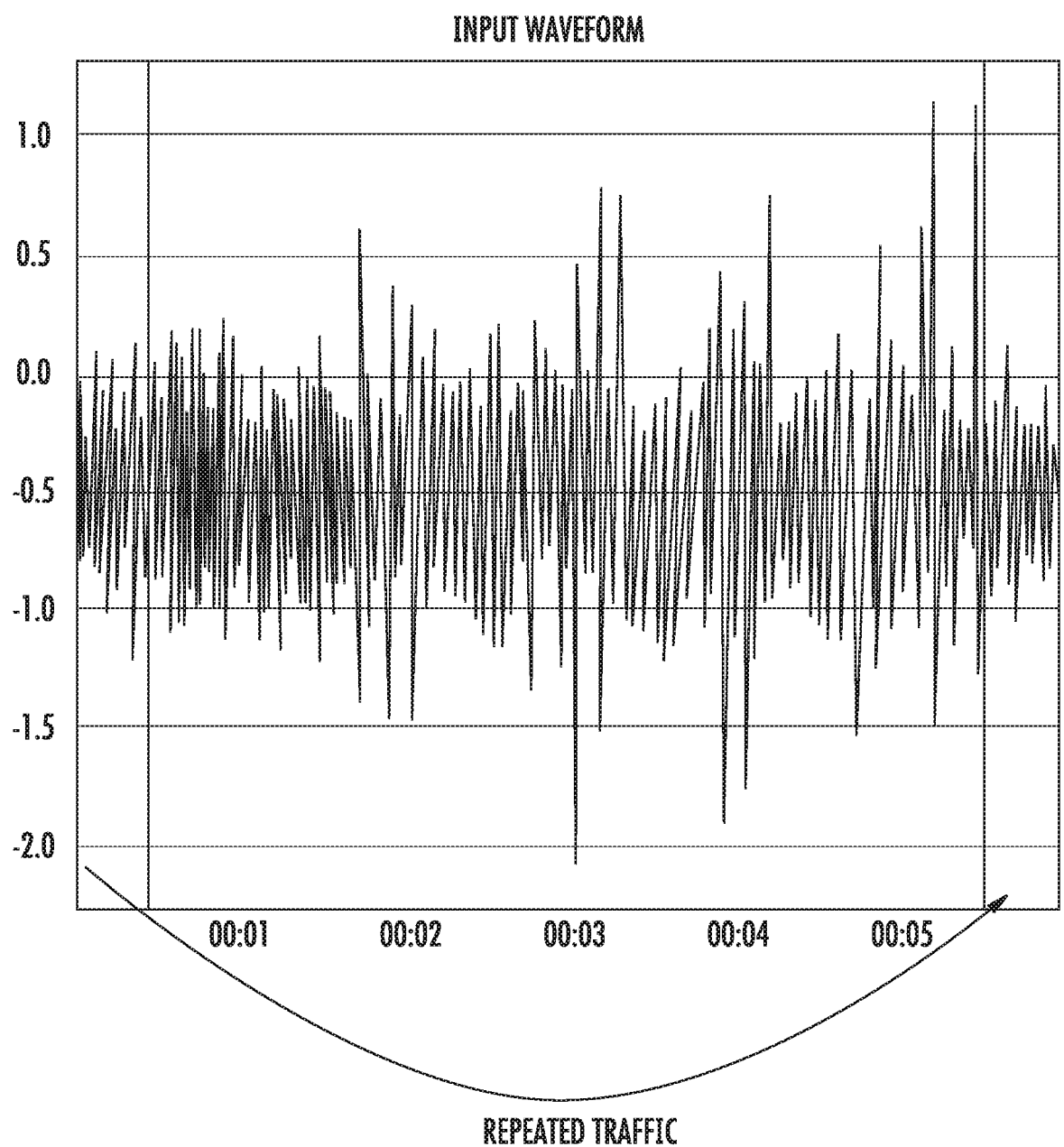
FIGS. 3A-3C illustrate the use of auto-correlation to detect repeated traffic.
Figure 3B:
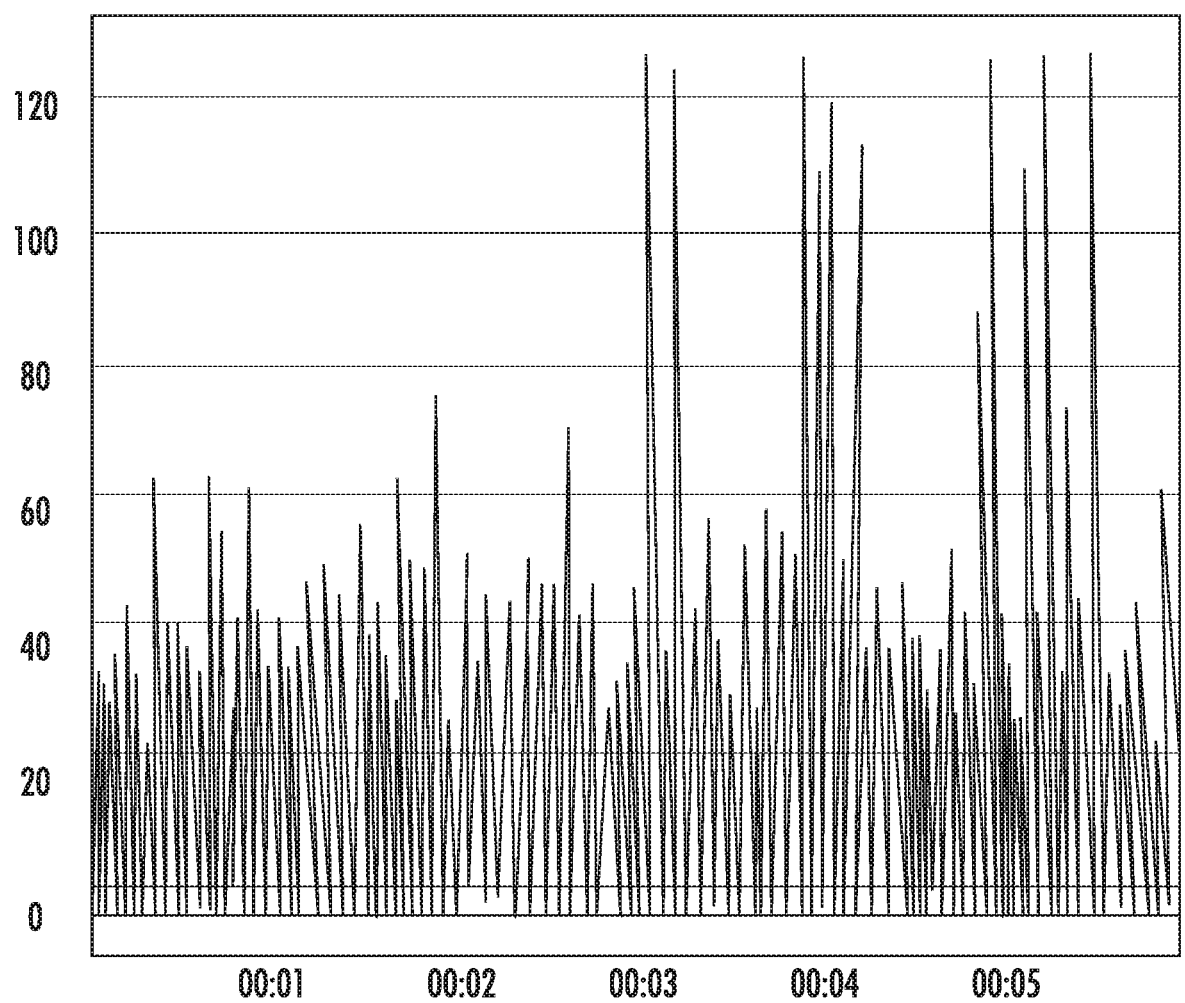
Figure 3C:
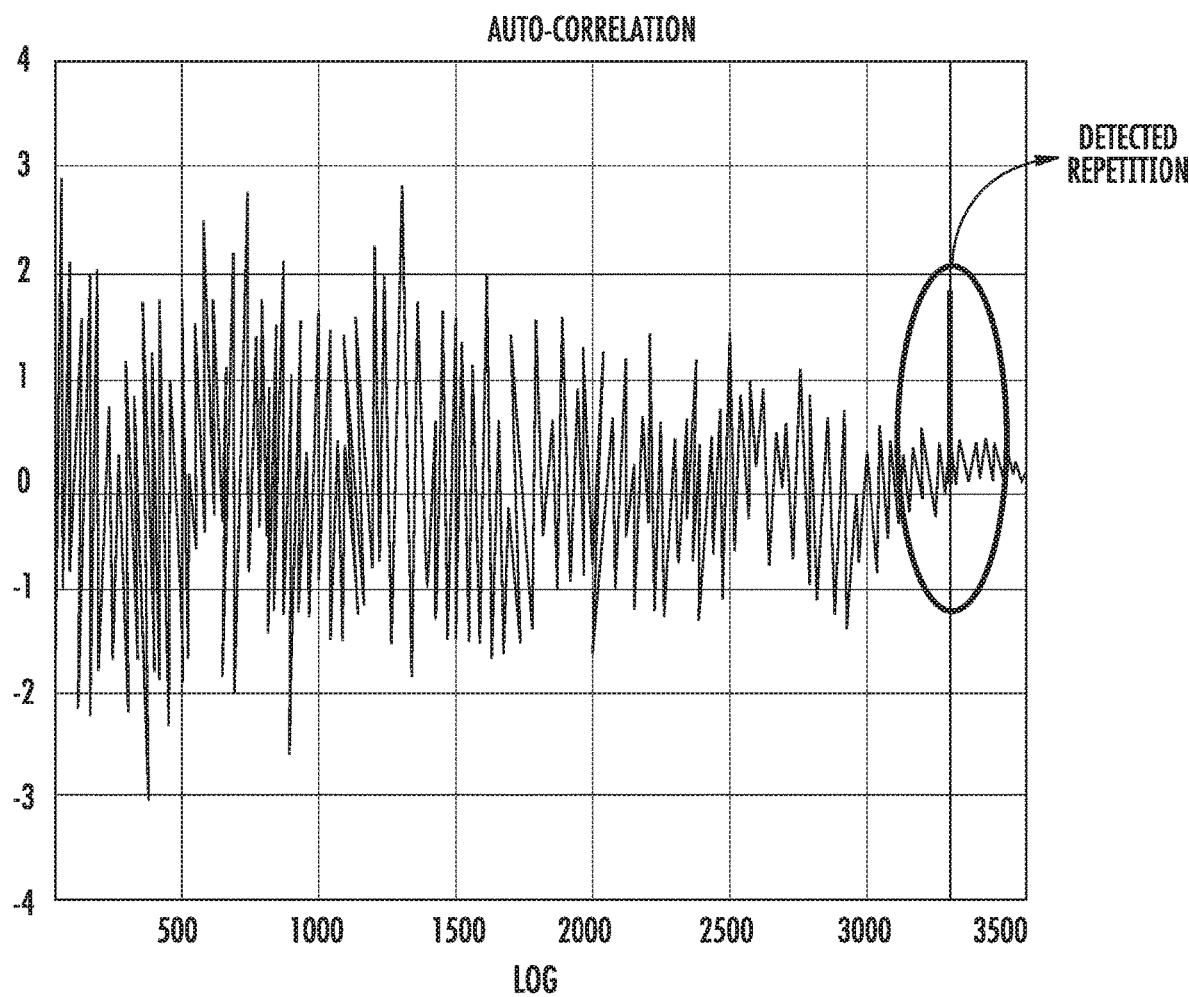

FIGS. 3A-3C illustrate an example of simulation results where auto-correlation between an input waveform or trace sequence and itself is used to detect repeated traffic. In FIG. 3A, an input waveform is illustrated. The waveform may be a plot of the values of a trace value sequence for a packet flow. FIG. 3B illustrates a resampled version of the input waveform to compress the amount of data being correlated. FIG. 3C illustrates auto-correlation of the resampled waveform. In FIG. 3C, the peak in the auto-correlation function indicated by the oval indicates a high correlation and the presence of repeated traffic in a packet flow. The presence of repeated traffic may indicate echo or poor quality encryption in a given flow. Because the auto-correlation can be computed with reduced complexity using the methods and systems described herein, network and flow characteristics can be more efficiently determined than using prior methods.

Figure 4:
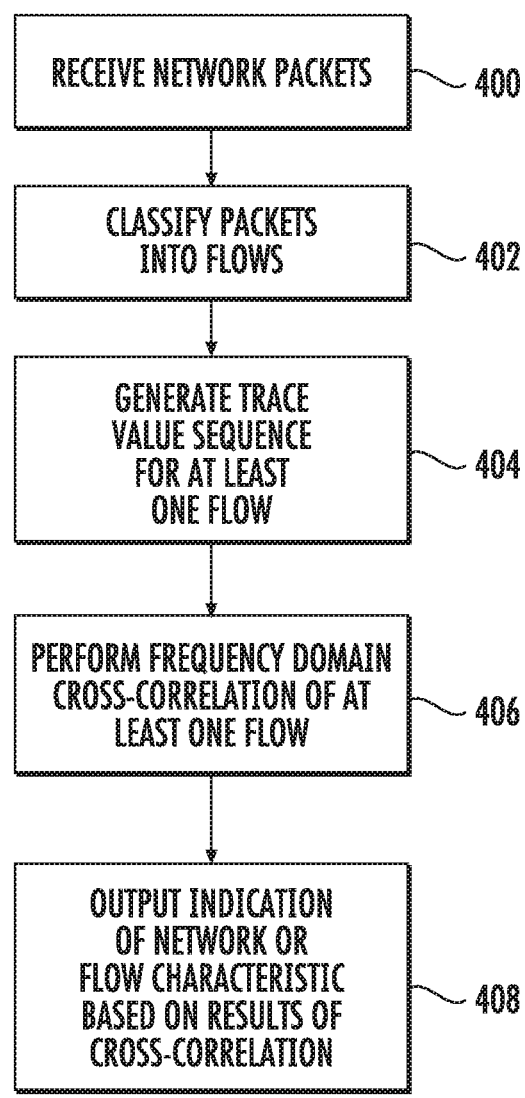
FIG. 4 is a flow chart illustrating an exemplary process for monitoring computing networks using cross-correlation of packet flows.

FIG. 4 is a flow chart illustrating an example process for monitoring a computer network using cross-correlation of packet flows. Referring to FIG. 4, in step 400, a plurality of packets copied from a communications network are received. For example, one or more network taps or monitoring ports, such as tap or monitoring port 205 illustrated in FIG. 2 may copy packets traversing the network. The packets may be TCP/IP packets, UDP/IP packets, or other protocol packets. The packets may include packets associated with a plurality of different packet flows.

In step 402, the packets are classified into flows. For example, the demultiplexer 207 may demultiplex the packets based on packet parameter values and route the packets to flow table entries 208. As stated above, in one example, the parameter values used to demultiplex the packets may be IP source address, IP destination address, protocol, source port, and destination port. Other combinations of one or more packet parameters may be used to identify packet flows without departing from the scope of the subject matter described herein. For example, packet group identifier (PGID) values inserted in packet payload.

In step 404, for at least one of the flows, a trace value sequence is generated. As stated above, the trace value sequence comprises a sequence of values that characterizes the flow according to a cross-correlation metric. Examples of cross-correlation metrics are described above. The metrics characterize the flow according to the selected metric, such as octet values, entropy, etc. The generation of the trace value sequences may be performed by flow measurement unit 202.

In step 406, a frequency domain cross-correlation of the at least one flow is performed using the trace value sequence. Cross-correlation unit 204 may utilize the cross-correlation theorem described above the used to perform the frequency domain cross-correlation of mean padded trace value sequences. Cross-correlation unit 204 may output results of the cross-correlations to characterizer 210. The results of the cross-correlation of two or more value sequences may be a sequence of values where a low value indicates that the trace value sequences are uncorrelated at a particular point in a high value indicates that the trace value sequences are correlated at a particular point.

In step 408, a network or flow characteristic is output based on the results of the cross-correlation. For example, characterizer 210 may output an indication of a network characteristic, such as latency, or a flow characteristic, such as repetition or encryption quality based, on results of the cross-correlation. As described above, network or flow characteristics that may be of interest may include latency, jitter, packet loss, address translation, correct operation of load balancers, loss of privacy in traffic mixers, traffic routing issues, etc.

In one example, traffic routing issues, may be detected when packets entering an ingress port and packets exiting an egress port are cross-correlated. If one or more packets are lost or misordered, the cross-correlation will be low at the locations corresponding to the lost or misordered packets.

In another example, jitter and latency may be identified from cross-correlation of two or more flows by detecting where corresponding features are present and calculating the time offset between the features.

Correct or incorrect operation of load balancers may be detected by cross-correlating load balancer outputs with load balancer input. If the load balancer outputs are supposed to be equally balanced, then each output should correlate similarly with, but be offset in time with the load balancer input. If load balancer outputs do not correlate similarly with the load balancer input, then the load balancer may be determined to be functioning improperly.

Loss of privacy may be detected by cross-correlating a traffic stream output from a mixer with the unmixed traffic stream input to the mixer. If there is a correlation between the non-anonymous input and the mixed output, then a loss of privacy may be indicated.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for monitoring a communications network using cross-correlation of packet flows, the method comprising:
receiving a plurality of packets copied from a communications network;
classifying the packets into flows;
for at least one flow of the flows, generating a trace value sequence, wherein the trace value sequence is a sequence of values that characterizes the flow according to a cross-correlation metric;
performing a frequency domain cross-correlation for the at least one flow using the trace value sequence; and
outputting an indication of a network or flow characteristic based on results of the cross-correlation,
wherein receiving the plurality of packets includes receiving the packets at a flow table and wherein classifying the packets into flows includes decoding the packets and routing the packets to flow table entries according to parameter values in headers of the packets.

2. The method of claim 1 wherein the parameter values include values of Internet protocol (IP) source address, IP destination address, protocol, source port, and destination port.

3. The method of claim 1 wherein the cross-correlation metric includes a maximum value detected in packet payload octets over an interval of P packets, where P is a programmable constant.

4. The method of claim 1 wherein the cross-correlation metric includes a mean value of packet payload octets over an interval of P packets, where P is a programmable constant.

5. The method of claim 1 wherein the cross-correlation metric includes a checksum of packet payload octets over an interval of P packets, where P is a programmable constant.

6. The method of claim 1 wherein the cross-correlation metric includes an entropy of packet payload octets over an interval of P packets, where P is a programmable constant.

7. The method of claim 1 wherein the cross-correlation metric includes octet values between offsets O1 and O2 for each packet over an interval of P packets, where O1, O2, and P are programmable constants.

8. The method of claim 1 wherein performing the frequency domain cross-correlation includes cross correlating the trace value sequence for the at least one flow with a trace value sequence of at least one additional flow and wherein outputting the indication of a network or flow characteristic includes outputting an indication of at least one of jitter, latency, and packet loss between the at least one flow and the at least one additional flow.

9. The method of claim 1 wherein performing the frequency domain cross-correlation includes cross correlating the trace value sequence for the at least one flow with itself and wherein outputting an indication of a network or flow characteristic includes outputting an indication of encryption quality of the at least one flow.

10. The method of claim 1 wherein performing the frequency domain cross-correlation includes padding the trace value sequence of the at least one flow using a mean value of the trace value sequence.

11. A system for monitoring a communications network using cross-correlation of packet flows, the system comprising:
a demultiplexer for receiving a plurality of packets copied from a communications network and classifying the packets into flows;
a flow measurement unit for, for at least one flow of the flows, generating a trace value sequence, where in the trace value sequence is a sequence of values that characterizes the packets according to a cross-correlation metric;
a cross-correlation unit for performing a frequency domain cross-correlation for the at least one flow using the trace value sequence; and
a characterizer for outputting an indication of a network or flow characteristic based on results of the cross-correlation,
wherein receiving the plurality of packets includes receiving the packets at a flow table and wherein classifying the packets into flows includes decoding the packets and routing the packets to flow table entries according to parameter values in headers of the packets.

12. The system of claim 11 wherein the parameter values include values of Internet protocol (IP) source address, IP destination address, protocol, source port, and destination port.

13. The system of claim 11 wherein the cross-correlation metric includes a maximum value detected in packet payload octets over an interval of P packets, where P is a programmable constant.

14. The system of claim 11 wherein the cross-correlation metric includes a mean value of packet payload octets over an interval of P packets, where P is a programmable constant.

15. The system of claim 11 wherein the cross-correlation metric includes a checksum of packet payload octets over an interval of P packets, where P is a programmable constant.

16. The system of claim 11 wherein the cross-correlation metric includes an entropy of packet payload octets over an interval of P packets, where P is a programmable constant.

17. The system of claim 11 wherein the cross-correlation metric includes a packet octet value between offsets O1 and O2 for each packet over an interval of P packets, where O1, O2, and P are programmable constants.

18. The system of claim 11 wherein performing the frequency domain cross-correlation includes cross correlating the trace value sequence for the at least one flow with a trace value sequence of at least one additional flow and wherein outputting the indication of a network or flow characteristic includes outputting an indication of at least one of jitter, latency, and packet loss between the at least one flow and the at least one additional flow.

19. The system of claim 11 wherein performing the frequency domain cross-correlation includes cross correlating the trace value sequence for the at least one flow with itself and wherein outputting an indication of a network or flow characteristic includes outputting an indication of encryption quality of the at least one flow.

20. The system of claim 11 wherein performing the frequency domain cross-correlation includes padding the trace value sequence of the at least one flow using a mean value of the trace value sequence.

21. A non-transitory computer readable medium having stored thereon executable instructions that when executed by a processor of a computer control the computer to perform steps comprising:
- receiving a plurality of packets copied from a communications network;
- classifying the packets into flows;
- for at least one flow of the flows, generating a trace value sequence, wherein the trace value sequence is a sequence of values that characterizes the flow according to a cross-correlation metric;
- performing a frequency domain cross-correlation for the at least one flow the trace value sequence; and
- outputting an indication of a network or flow characteristic based on results of the cross-correlation,
- wherein receiving the plurality of packets includes receiving the packets at a flow table and wherein classifying the packets into flows includes decoding the packets and routing the packets to flow table entries according to parameter values in headers of the packets.

* * * * *